United States Patent [19]

Moss

[11] 4,431,622

[45] Feb. 14, 1984

[54] PROCESS FOR PRODUCING $CO_2$, AND $CO_2$ SO PRODUCED

[75] Inventor: Gerald Moss, Wantage, England

[73] Assignee: Exxon Research and Engineering Co., Florham Park, N.J.

[21] Appl. No.: 360,412

[22] Filed: Mar. 22, 1982

[30] Foreign Application Priority Data

Mar. 24, 1981 [GB] United Kingdom ............... 8109213

[51] Int. Cl.³ .................. C01B 31/20; C01V 3/02
[52] U.S. Cl. .................................. 423/437; 423/168; 423/542; 48/DIG. 1; 252/373
[58] Field of Search ............... 423/168, 170, 175, 437, 423/438, 542, 539; 252/373; 48/DIG. 1

[56] References Cited

U.S. PATENT DOCUMENTS

| | | | |
|---|---|---|---|
| 1,772,652 | 8/1930 | White | 423/437 |
| 2,602,019 | 7/1952 | Odell | 423/437 |
| 2,970,893 | 2/1961 | Viles | 423/170 |
| 3,397,962 | 8/1968 | Squires | 423/437 |
| 3,402,998 | 9/1968 | Squires | 423/168 |
| 3,535,082 | 10/1970 | Nurnberg et al. | 423/438 |
| 3,707,462 | 12/1972 | Moss | 423/542 |
| 4,309,198 | 1/1982 | Moss | 423/542 |

FOREIGN PATENT DOCUMENTS

| | | | |
|---|---|---|---|
| 15333 | 8/1979 | European Pat. Off. | |
| 13590 | 7/1980 | European Pat. Off. | 423/542 |
| 1502495 | 3/1978 | United Kingdom | |
| 1550354 | 8/1979 | United Kingdom | |
| 2039293 | 8/1980 | United Kingdom | 423/542 |

Primary Examiner—Gary P. Straub
Attorney, Agent, or Firm—Edward H. Mazer

[57] ABSTRACT

Fuel is passed (via line 13) to a fluidized fuel conversion bed (21) containing reactive CaO and $CaSO_4$ at a fuel-oxidation temperature (e.g. 730° C.) below the temperature at which CaO reacts with $CO_2$ to form $CaCO_3$. The bed is fluidized by an inerts-free gas containing hydrogen (and/or a source thereof, e.g. steam) and fuel is therein partially oxidized, $CaSO_4$ being reduced to CaS. $CO_2$ thus formed is fixed as $CaCO_3$, and bed solids containing CaS and $CaCO_3$ pass (via 33) to a fluidized decarbonation bed (34) operated at a temperature (e.g. 850° C.) above the decarbonation temperature of $CaCO_3$ whereby $CO_2$ is liberated and is recovered after passage through a heat recovery device (6). Decarbonation bed (34) is preferably fluidized by the gas products from the fuel conversion which reduce $CaSO_4$ therein to CaS and form additional $CO_2$. Bed solids containing CaS and CaO pass (line 37) to an oxidation bed (36) fluidized with air to convert CaS to $CaSO_4$ with much heat liberation. Hot bed solids are returned to the decarbonation and fuel conversion beds to furnish heat and $CaSO_4$ to maintain the reactions therein.

8 Claims, 1 Drawing Figure

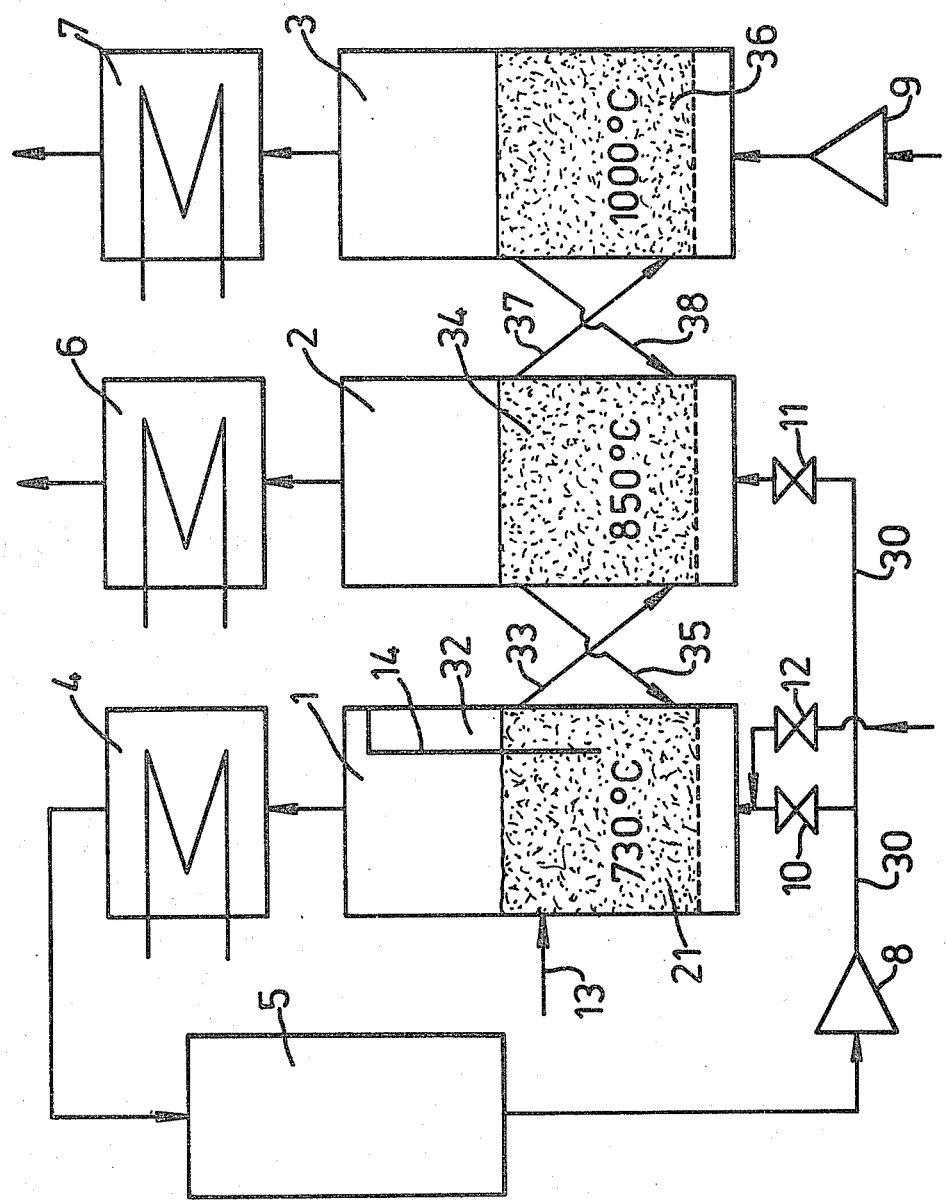

PROCESS FOR PRODUCING $CO_2$, AND $CO_2$ SO PRODUCED

The present invention relates to a process for producing $CO_2$, and to $CO_2$ so produced.

It has recently been demonstrated that $CO_2$ is useful for reducing the viscosity of crude oil and can be used to recover additional crude oil from oil-bearing formations which have been depleted by primary and secondary recovery techniques. The amounts of $CO_2$ required for this purposes could be very large since a substantial proportion of gas injected into an oil well is irrecoverable. One scheme for providing $CO_2$ for enhanced crude oil recovery proposes the recovery of $CO_2$ from a subterranean source of $CO_2$ by means of a well, and then piping the thus recovered $CO_2$ at a high pressure for several hundred miles to an oil-field. It goes without saying that this scheme is very costly.

$CO_2$ is becoming widely used in horticulture to promote the growth of plants in greenhouses and like enclosures.

$CO_2$ can be obtained from the flue gas of a conventional boiler, but its concentration of up to 14 vol % would necessitate the use of a suitable process to concentrate the $CO_2$. At the present time, only wet gas-scrubbing processes can satisfactorily recover large volumes of $CO_2$, but wet scrubbing processes are notoriously energy-inefficient.

The present invention provides a process, and an installation for performing the process, for making $CO_2$, the process comprising the steps of:

(a) passing a fuel to a dense-phase fluidized fuel-conversion bed containing particles comprising reactive $CaSO_4$ and particles comprising reactive $CaO$, the bed being fluidized by passing into the bottom thereof a fluidizing gas which is substantially free of inert diluents but which contains a mediating moiety and/or a source thereof for mediating the transfer of oxygen from $CaSO_4$ to fuel whereby the fuel is partially oxidized to products including $CO$ and $CO_2$, and some $CaSO_4$ is reduced to $CaS$ substantially without the liberation of sulfur moieties, the temperature of the fuel conversion bed being no greater than the maximum temperature at which $CaO$ will react with $CO_2$ to form $CaCO_3$;

(b) causing particles including particles comprising $CaSO_4$, particles comprising $CaS$ and particles comprising $CaCO_3$ to pass to a fluidized decarbonation bed (preferably a dense phase bed) which is fluidized by passing into the bottom thereof at least some of the partially oxidized gas products from the fuel conversion bed, which gas products include a mediating moiety and/or a source thereof for mediating the transfer of oxygen from $CaSO_4$ to $CO$ whereby to oxidize $CO$ to $CO_2$ and to reduce $CaSO_4$ to $CaS$, the decarbonation bed being operated at a temperature above the decarbonation temperature of $CaCO_3$ whereby $CaCO_3$ is decomposed to $CaO$ and $CO_2$ thereby increasing the amount of $CO_2$ in the gas passing through the decarbonation bed; and (c) recovering a gas containing $CO_2$ from the top of the decarbonation bed.

Preferably, particles including particles containing reactive $CaS$, are caused to pass to a fluidized oxidation bed (preferably a dense phase bed) in which the particles are fluidized by passing into the bottom of the bed a gas containing molecular oxygen whereby at least some reactive $CaS$ is oxidized to reactive $CaSO_4$ with the liberation of heat which maintains the oxidation bed at a temperature above that of the fuel-conversion bed. Preferably, CaS-containing particles are passed to the oxidation bed from the decarbonation bed.

The oxidation bed is preferably operated under such conditions that the gas leaving the top of the bed is substantially free of sulfur moiety.

Particles containing reactive $CaSO_4$ are preferably caused to pass to the decarbonation bed and/or to the fuel conversion bed.

The oxidation bed is operated at a temperature exceeding the temperature of the decarbonation bed when the operating pressures of the oxidation and decarbonation beds are substantially equal.

Preferably, the fluidizing gas passed into the bottom of the fuel conversion bed comprises at least part of the partially oxidized gas products produced by the operation of the fuel conversion bed.

In instances wherein the process is operated with a fuel which contains sulfur, sulfur moieties from the fuel are preferably fixed by reaction with $CaO$ in the fuel conversion bed to form $CaS$.

In order to avoid a progressive increase in the inventory of chemically fixed sulfur, the process may comprise the further step of passing particles containing $CaS$ to a fluidized regenerator bed, passing a gas containing molecular oxygen into the bottom of the regenerator bed, and maintaining the operating conditions of the regenerator bed such that $CaS$ is converted to reactive $CaO$ with the liberation of sulfur moiety.

Preferably, particles containing reactive $CaO$ are returned directly and/or indirectly to the fuel conversion bed for use in fixing further amounts of sulfur moiety from the sulfur-containing fuel.

Particles are preferably passed from the decarbonation bed to the fuel conversion bed to maintain the inventory of reactive materials in the fuel conversion bed.

The invention is now further described with reference to a non-limitative example thereof and with reference to the accompanying drawing which is a flow sheet showing the principal features of an installation for performing the process of the invention.

In the drawing, a dense phase fluidized fuel conversion bed 21 of particles comprising reactive $CaSO_4$ and $CaO$ is contained in vessel 1. A fuel, which may be a solid fuel (e.g. coal, lignite, oil shale) and/or a fluid fuel (e.g. natural gas, crude oil or one or more fractions thereof) is passed into the fuel conversion bed 21. A gas containing a mediator to mediate the transfer of oxygen from $CaSO_4$ (which is reduced to $CaS$) to the fuel is passed into the bottom of the fuel conversion bed 21 and the fuel is partially oxidized to produce a mixture of pyrolysates and partial oxidation products including (inter alia) tars and other hydrocarbons, $CO$, $H_2$ and $CO_2$, the proportions of $CO$ and $CO_2$ being determined by the operating conditions in bed 21 and kinetic considerations, as will be appreciated by those skilled in the art. The bed 21 is maintained at conditions of pressure and temperature such that a significant proportion of the $CO_2$ produced reacts exothermically with $CaO$ to form $CaCO_3$ in the bed. The removal of $CO_2$ by reaction with $CaO$ promotes the production of further quantities of $CO_2$ in the bed 21 in accordance with well known chemical and thermodynamic considerations in relation to the oxidation of carbon to $CO$ and $CO_2$. At about atmospheric pressure, the bed 21 may be operated at a temperature of 700° to 750° C., e.g. about 730° C.

Sulfur from the fuel reacts with CaO to form CaS. Thus, the gas leaving the top of the fuel conversion bed 21 at the temperature of the bed 21 comprises condensible tars and hydrocarbons, $H_2$, water vapour and carbon oxides. The hot gas is passed through a heat recovery device 4 which may be part of a boiler installation and wherein the gas is cooled to a temperature at which tars and hydrocarbons condense. The combustible part of the condensate is recovered (not shown) and is preferably employed as fuel which is passed to the fuel conversion bed 21 via a suitable conduit (not shown). The cooled gas exiting device 4 comprises $CO_2$, CO and $H_2$ and passes through a particulates-removing system 5 and cool, clean gas is circulated by a fan 8 into line 30. Some of the gas from line 30 passes into the bottom of the bed 21 where it serves to fluidize the particles in the bed. The amount of gas passing into the bed 21 is determined by the setting of the valve 10. A supplement of steam, which may be produced in the boiler installation, may be added to the gas to improve fuel conversion by the water gas reaction and also to improve fluidization. The amount of steam added is regulated by valve 12.

The hydrogen in the bed 21 tends to be the main mediator for the transfer of oxygen from $CaSO_4$ to the fuel and substantially none of the $CaSO_4$ is decomposed to liberate sulfur moiety in the presence of hydrogen and/or other mediator(s), particularly at lower operating temperatures.

It will be seen from the foregoing that the gas passed into the fuel conversion bed 21 is substantially free of inert diluents, such as nitrogen, and the gas product is also free of inert diluents except for minor amounts of nitrogen (and other inert diluents) which may have been present in the fuel.

Char and other solid carbonaceous fuel material in the bed tends to have a relatively high ratio of aerodynamic drag to weight, and there may be a tendency for char materials to be more concentrated at the top regions of the bed 21 than elsewhere. A baffle 14 extends from above the top level of the bed 21 to below the top level (but not to the bottom of the bed) to prevent or at least reduce the passage of solid fuel material into the space 32 defined between the baffle and the wall of the vessel 1, and particles pass from the space 32 into a transfer line 33 which extends from a top region of the bed 21 in space 32 to a bottom region of a fluidized decarbonation bed 34 by any means known in the art (e.g. pneumatic transfer using a suitable gas). The bed 34 is contained in a vessel 2, and the bed is fluidized by passing into the bottom thereof clean product gas from line 30 at a rate determined by valve 11.

The bed 34 is operated at decarbonation conditions, and for operation at about atmospheric pressure, a temperature of about 850° to 900° C. is suitable. The gas entering from line 30 contains CO and $H_2$ which react with $CaSO_4$ to reduce the latter to CaS to produce $CO_2$ and $H_2O$. The $CO_2$ thus produced is in addition to $CO_2$ produced by the decarbonation of $CaCO_3$ obtained by the carbonation of CaO in bed 21, and the gas leaving the top of the decarbonation bed 34 at a temperature approximately equal to the bed temperature contains $CO_2$, $H_2O$ and is substantially free of inert diluents, such as nitrogen. The gas will be substantially free of sulfur moiety since at the operating temperature of bed 34, the amounts of sulfur moiety which could be liberated even under oxidizing conditions would be very small (e.g., of the order of about 100 parts per million), and the tendency for even these small amounts of sulfur moiety to be liberated is reduced or substantially eliminated by the presence of $H_2$ (or other oxygen-transfer mediator) in bed 34.

Heat is recovered from the hot gas leaving vessel 2 by a heat recovery device 6 which may be part of the boiler installation, and the gas leaving device 6 is substantially pure $CO_2$ together with some $H_2O$ which may be removed in any convenient manner, if desired.

The particles of the decarbontion bed will include CaS resulting from the reduction of $CaSO_4$, CaO resulting from the decomposition of $CaCO_3$, CaS resulting from the capture or fixing of sulfur from the fuel (if the fuel contains sulfur, as it usually will) in the fuel conversion bed 21 and unreacted CaO from bed 21. Particles are passed from a top region of the decarbonation bed 34 to a bottom region of the fuel conversion bed 21 via a transfer line 35. The particles thus transferred are substantially at the temperature of the bed 34 and add their sensible heats to the bed thereby helping to maintain the temperature of bed 21.

The reactions in the fuel conversion bed 21 deplete the availability of $CaSO_4$ to maintain the partial oxidation of fuel. In order to restore the availability of $CaSO_4$, particles are passed from a top region of the decarbonation bed 34 to a bottom region of an oxidation bed 36 via a transfer line 37.

The oxidation bed 36 is contained in a vessel 3 and is fluidized by passing a gas containing molecular oxygen into the bottom of the bed 36. A suitable gas is air (which may be preheated by heat exchange (not shown) with one or more of the gas streams leaving any one of the fluidized beds and/or by passage through heating coils in one or more of the vessels). The air (or other gas containing molecular oxygen) is passed into the oxidizing bed by a fan 9 at a rate determined by a suitable valve system (not shown). GaS is oxidized to $CaSO_4$, and this oxidation being strongly exothermic maintains the temperature of the oxidation bed 36 at 950° to 1100° C., e.g. about 1000° C. The air is supplied in excess of the stoichiometric requirement so that the oxygen-depleted gas leaving the top of the bed 36 has a small content of oxygen (e.g. up to 5 vol %, preferably 1 to 2 vol %). The provision of excess oxygen suppresses the oxidation of CaS to CaO and $SO_2$ so that the hot gas leaving the top of bed 36 is substantially free of sulfur moiety. The hot gas leaving the oxidation bed 36 at approximately the temperature thereof is passed through a heat recovery device 7 which may be part of the boiler installation. The oxygen-depleted gas, which will be predominantly nitrogen, may be recovered for use as an inerting or blanketing gas or for other use in which nitrogen is employed (e.g. ammonia manufacture and/or for use in the recovery of crude oil from oil-bearing rock formations either alone or in combination with the $CO_2$ available from the decarbonation bed 34.

The particles in the oxidation bed 36 comprise $CaSO_4$ and CaO some of which has been derived by decarbonation of $CaCO_3$ in bed 34 and some of which has not participated in any chemical reaction. Particles are passed from the oxidation bed 36 either directly to the fuel-conversion bed 21 by a suitable transfer line (not shown) to maintain the concentration of reactive $CaSO_4$ therein and to maintain the fuel conversion temperature, or particles may be passed from the oxidation bed 36 to the decarbonation bed 34 (so that particles containing $CaSO_4$ pass therefrom to the fuel conversion bed 21), or particles may be passed to both the fuel conversion bed 21 and the decarbonation bed 34.

As shown in the drawing, particles are passed from a top region of the oxidation bed 36 to a bottom region of the decarbonation bed 34 via a transfer line 38 whereby to augment the heat input to bed 34, and to provide that $CaSO_4$ from the oxidation bed 36 passes indirectly to the fuel conversion bed 21 by passage via the decarbonation bed 34.

Most fuels contain sulfur, and the particles include particles containing CaO to capture or fix the CaO as CaS in the fuel conversion bed 21. In order to avoid a continued increase from this source in the amount of chemically combined sulfur in the beds 21, 34 and 36, a side stream (not shown) of particles is subjected to a treatment to remove sulfur moiety. A convenient method (not illustrated) of removing sulfur is to pass particles from the decarbonating bed 34 to a regenerator wherein the particles are fluidized in a bed by air (or other gas containing molecular oxygen) under such conditions that the gas leaving the bed contains substantially no oxygen, as is described in our U.S. patent specification No. 3807090. In the substantial absence of excess oxygen, and at elevated temperatures, e.g. in the range 800° to 1150° C., CaS decomposes exothermically as follows:

$$2CaS + 3O_2 \rightarrow 2CaO + 2SO_2$$

The $SO_2$ may be recovered as such or converted to sulfur or other sulfur products, and the hot regenerated CaO is returned to the bed system—e.g. to bed 34 and/or to bed 21 wheein it serves to maintain the operating temperature(s) and the inventory of CaO.

Inevitably, in practice, the chemical reactivity of particles declines over a period of operation and it is necessary to add fresh reactive material (e.g. $CaSO_4$ and/or $CaCO_3$ and/or CaO) to the bed system and to purge particles therefrom to maintain the overall reactivity of the particles in the bed system. The numerous ways in which the foregoing may be effected will not be described since they are within the competence of the technologist to which this patent specification is primarily addressed.

The installation as herein described may be regarded as or utilized as a boiler installation providing (a) useful heat which is recoverable from the heat recovery devices 4, 6 and 7 as steam for power production and/or use as process steam, and/or as preheated air (at least some of which may be the air supplied to bed 36 by the fan 9), and (b) two main off-gas streams, one being of $CO_2$ and the other being of nitrogen containing only a small concentration of oxygen. The nitrogen-rich stream will be virtually free of $NO_x$ since the temperatures within the bed 36 are too low for $NO_x$ formation. As a further bonus, elemental sulfur may be obtained when the fuel employed contains sulfur —e.g. by the process described in our U.K. patent No. 1541431 and U.S. Pat. No. 4041141.

The invention comprises, besides the process herein described and defined, an installation for performing the process as herein described and defined.

I claim:

1. A process for making $CO_2$ comprising the steps of:
(a) passing a carbon-containing fuel to a dense-phase fluidized fuel-conversion bed containing particles comprising reactive $CaSO_4$ and particles comprising reactive CaO, the bed being fluidized by passing into the bottom thereof a fluidizing gas which is substantially free of nitrogen and which contains an oxygen transfer agent and/or a source thereof for mediating the transfer of oxygen from $CaSO_4$ to fuel whereby the fuel is partially oxidized to products including CO and $CO_2$, and some $CaSO_4$ is reduced to CaS substantially without the liberation of sulfur moieties, the temperature of the fuel conversion bed being such that CaO will react with $CO_2$ to form $CaCO_3$ within the fuel conversion bed;
(b) causing particles including particles comprising $CaSO_4$, particles comprising CaS and particles comprising $CaCO_3$ to pass to a fluidized decarbonation bed which is fluidized by passing into the bottom thereof at least some of the partially oxidized gas products obtained from the fuel conversion bed, said gas products constituting the sole fluidizing medium for the fluidized decarbonation bed and which gas products include hydrogen and/or a source thereof for transferring oxygen from $CaSO_4$ to CO to thereby oxidize CO to $CO_2$ and to reduce $CaSO_4$ to CaS, the decarbonation bed being operated at a temperature above the decarbonation temperature of $CaCO_3$ whereby $CaCO_3$ is decomposed to CaO and $CO_2$ thereby increasing the amount of $CO_2$ in the gas passing through the decarbonation bed;
(c) recovering a gas containing $CO_2$ from the top of the decarbonation bed;
(d) passing particles containing reactive CaS from the fluidized decarbonation bed to a fluidized oxidation bed in which the particles are fluidized by passing into the bottom of the bed a gas containing molecular oxygen whereby at least some reactive CaS is oxidized to reactive $CaSO_4$ with the liberation of heat which maintains the temperature of the oxidation bed above that of the fuel-conversion bed; and,
(e) passing particles containing reactive $CaSO_4$ from the oxidation bed to the decarbonation bed and/or to the fuel-conversion bed.

2. The process of claim 1 further comprising the step of passing particles from the decarbonation bed to the fuel conversion bed.

3. The process of claim 2 wherein the fuel contains sulfur whereby sulfur moieties from the fuel are fixed by reaction with CaO in the fuel conversion bed to form CaS.

4. The process of claim 2 wherein the oxidation bed is operated at a temperature between 950° C. and 1100° C. and with air supplied in excess of the stoichiometric requirement so that the gas leaving the top of the bed is substantially free of sulfur moiety.

5. The process of claim 4 wherein the oxidation bed is operated at a temperature exceeding the temperature of the decarbonation bed when the operating pressures of the oxidation and decarbonation beds are substantially equal.

6. The process of claim 5 wherein the fluidizing gas passed into the bottom of the fuel conversion bed comprises at least part of the partially oxidized gas products produced by the operation of the fuel conversion bed.

7. The process of claim 6 further comprising passing particles containing CaS to a fluidized regenerator bed, passing a gas containing molecular oxygen into the bottom of the regenerator bed, and maintaining the operating conditions of the regenerator bed such that CaS is converted to reactive CaO with the liberation of sulfur moiety.

8. The process of claim 7 wherein particles containing reactive CaO are returned directly and/or indirectly from the regenerator bed to the fuel conversion bed for use in fixing further amounts of sulfur moiety from the sulfur-containing fuel.

* * * * *